United States Patent [19]

Noel

[11] Patent Number: 4,669,271

[45] Date of Patent: Jun. 2, 1987

[54] METHOD AND APPARATUS FOR MOLDED ICE SCULPTURE

[76] Inventor: Paul Noel, 2181 Avenue Road, Toronto, Ontario, Canada, M5M 4B8

[21] Appl. No.: 790,395

[22] Filed: Oct. 23, 1985

[51] Int. Cl.⁴ ............................................. B65B 63/08
[52] U.S. Cl. .................................. 62/60; 62/66; 62/340; 62/529; 249/117; 264/28
[58] Field of Search ............... 62/60, 62, 64, 66, 59, 62/340, 529; 249/28, 117

[56] References Cited

U.S. PATENT DOCUMENTS

| | | | |
|---|---|---|---|
| 2,633,006 | 3/1953 | Taylor | 249/171 |
| 2,736,277 | 2/1956 | Cole, Jr. | 249/170 |
| 2,966,041 | 12/1960 | Zearfoss, Jr. et al. | 62/60 |
| 4,206,899 | 6/1980 | Whitehead | 264/28 |
| 4,484,448 | 11/1984 | Crabb, Jr. | 62/60 |
| 4,505,121 | 3/1985 | Gram | 62/60 |
| 4,550,575 | 11/1985 | DeGaynor | 264/28 |

*Primary Examiner*—Ronald C. Capossela
*Attorney, Agent, or Firm*—Norman B. Rainer

[57] ABSTRACT

An inexpensive and easily utilized apparatus is provided for producing molded ice structures of improved clarity. The apparatus is comprised of at least two contoured sidewalls adapted to be releasibly joined at flat peripheral flanges to define a supported enclosure having an upwardly opening extremity bordered by a horizontally disposed flat rim. A thin flexible water-impermeable envelope contoured to match the interior configuration of the enclosure is adapted to be inserted into said enclosure in a manner such that the mouth opening of the envelope is draped across said rim. A thermally insulative cover is adapted to rest upon the sidewalls whereby the mouth of the envelope is held in sandwiched engagement between the cover and rim. In a method of producing ice structures from said apparatus, the assembled apparatus filled with water is placed in a freezing environment. The sidewalls are then separated and the envelope is peeled off the ice structure.

2 Claims, 4 Drawing Figures

METHOD AND APPARATUS FOR MOLDED ICE SCULPTURE

BACKGROUND OF THE INVENTION

This invention concerns the production of molded sculptures of ice.

Ice sculptures have long been appreciated for their esthetic appearance, due primarily to the smoothly flowing surfaces of the ice and to the clarity of the light transmitted therethrough. Ice sculptures have often been used as distinctive decorations for banquets, celebrations, and festive occasions. When fashioned as bowls, the ice sculptures provide a desired cooling effect to the contents of the bowl.

In the past, ice sculptures have generally been fabricated from large blocks of ice, using special tools to chip, form, and smooth the ice. In this process, a great deal of the mass of ice in the original block is wasted. Moreover, the labor involved in forming the ice sculpture has resulted in generally high cost of the sculptures.

A method of molding ice sculptures is described in U.S. Pat. No. 4,206,899, said method involving supporting a water-filled flexible mold in inverted position within a rectangular outer box. Because of the hydrostatic pressure of the water, especially with large sculptures, the flexible mold must be of sufficiently thick wall structure to prevent distortion.

The necessary thick-walled flexible molds are expensive to make and difficult to peel off the ice sculpture. It is also found that sculptures made by the method and apparatus of U.S. Pat. No. 4,206,899 contain cracks which detract from the appearance and structural integrity of the sculpture.

It is accordingly an object of the present invention to provide a method and apparatus for producing molded ice sculptures substantially devoid of cracks.

It is another object of this invention to provide apparatus for producing large molded ice sculptures, said apparatus utilizing a thin flexible confining envelope.

It is a further object of the present invention to provide an improved ice sculpture mold of simple and rugged construction capable of versatile configuration and prolonged duration of use.

These objects and other objects and advantages of the invention will be apparent from the following description.

SUMMARY OF THE INVENTION

The above and other beneficial objects and advantages are accomplished in accordance with the present invention by an apparatus for molding structures of ice comprising:

(a) at least two sidewalls, each configured to produce a portion of a three-dimensional sculpture and having a flat upper rim adapted to be disposed in a horizontal plane and a flat peripheral flange disposed along the side extremities of the sidewall in a plane perpendicular to said rim, said sidewalls being adapted to mate at their flanges whereby the rims meet to form a closed planar perimeter and thereby form an enclosure which is open at its upper extremity defined by said upper rims, said upper extremity being adapted to be substantially horizontally disposed and representing the top or bottom of a sculpture to be made in said mold, (b) clamping means adapted to releasibly hold the flanges of said sidewalls in tight abutment, (c) support means to maintain the mold upright whereby said upper extremity is caused to lie in a substantially horizontal plane, (d) a contoured thin flexible water-impermeable envelope which matches the configuration of said enclosure and has a mouth opening adapted to fit onto said upper rim, and (e) a thermally insulative cover adapted to rest upon said upper rims whereby the mouth of said envelope is held in sandwiched engagement between said cover and rim.

The method of the present invention for making ice sculptures comprises:

(f) assembling the aforesaid molding apparatus by clamping the flanges of the sidewalls together to form an enclosure, (g) supporting the mold such that the flanges are in a vertical plane and the upper rims are in a horizontal plane, (h) inserting the aforesaid envelope into said enclosure in a manner such that the contour of the envelope registers with the configuration of the sidewalls, and draping the mouth opening of the envelope over said upper rims, (i) filling the envelope with water, (j) placing the aforesaid insulative cover upon the rims, (k) placing the entire assembly in a cold environment to cause freezing of the water to an ice sculpture, (l) removing the cover, (m) separating the sidewalls, and (n) peeling the envelope from the ice sculpture in a manner whereby the envelope is inverted to an inside out configuration readily reversed for subsequent use.

In a specific aspect of the method of this invention, bowl sculptures are made by the aforesaid procedure but with the exception that the mold is removed from the cold environment prior to complete freezing of the water. By virtue of the presence of the insulated cover, such procedure causes an unfrozen centered depression to exist which constitutes the interior of the bowl. The flanges are preferably provided with alignable holes which permit joinder of the flanges by bolting. The supporting means may be portions of the flange, or vertically disposed members such as posts attached to the sidewalls and extending to coplanar lowermost extremities adapted to rest upon a flat floor surface.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

For convenience in description, the terms "interior" and "exterior", or words of similar import will have reference to the geometric center of said molding apparatus. Similarly, the expressions "upper" and "lower" or equivalents thereof will have reference to the upper and lower extremities, respectively, of the molding apparatus shown in FIG. 2.

DESCRIPTION OF THE PREFERRED EMBODIMENT

Figure 1:
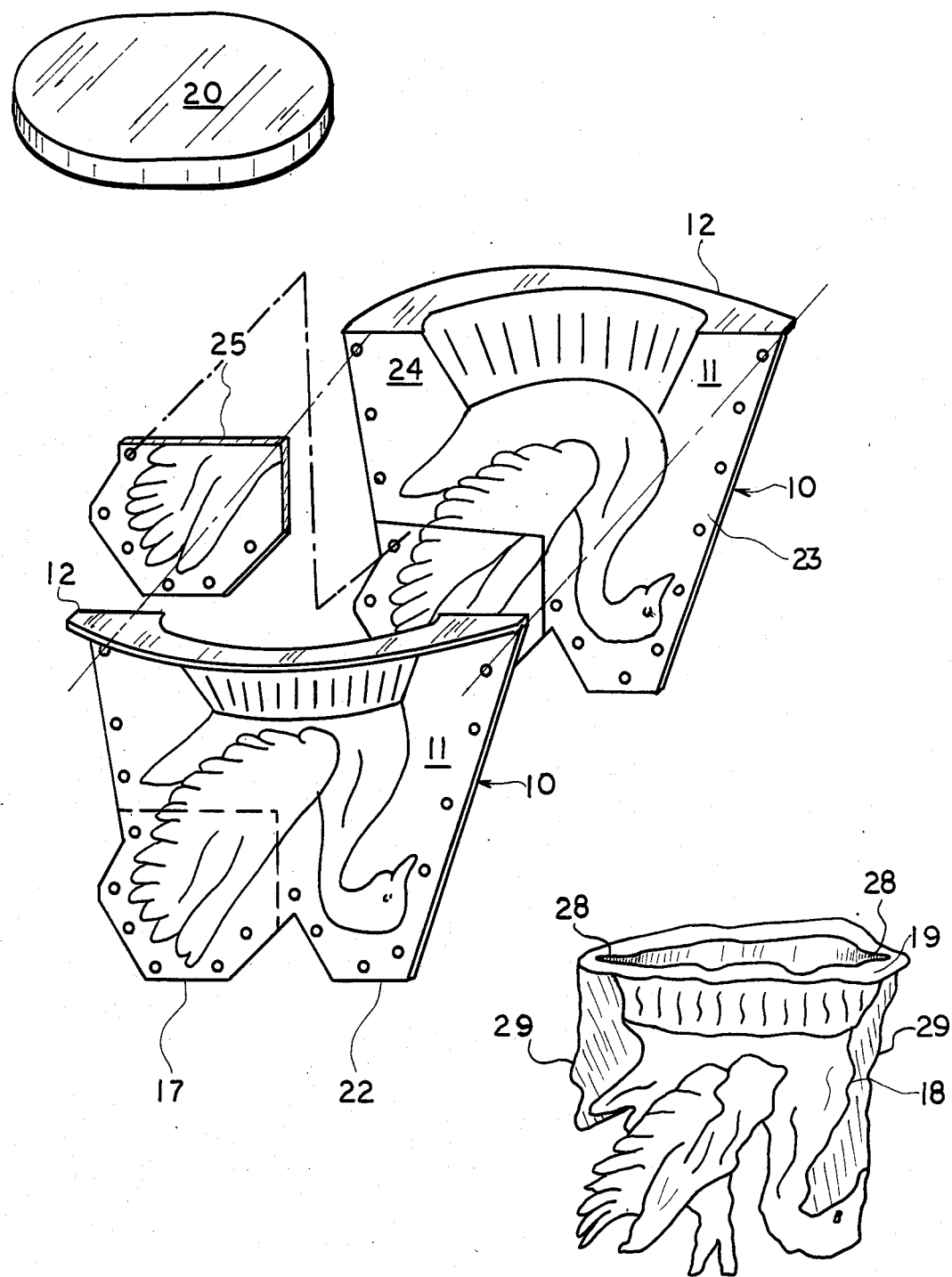
FIG. 1 is an exploded view of an embodiment of a molding apparatus of this invention having a configuration which produces a statue resembling a swan.
Figure 2:
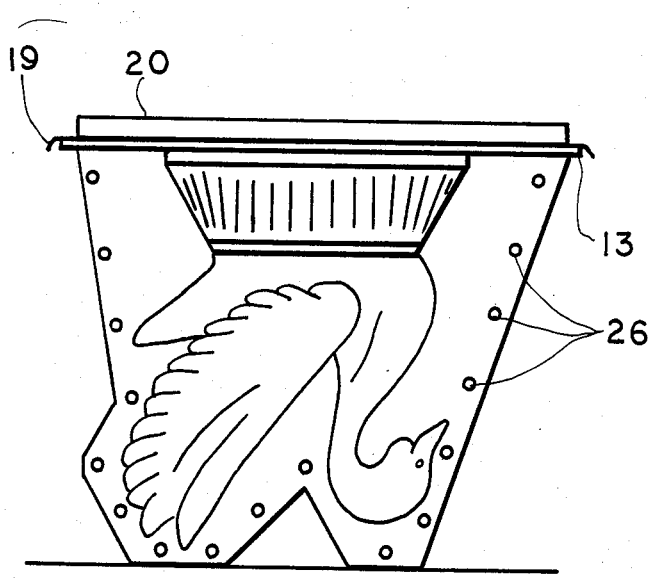
FIG. 2 is a side view of the molding apparatus of FIG. 1 in assembled form.
Figure 3:
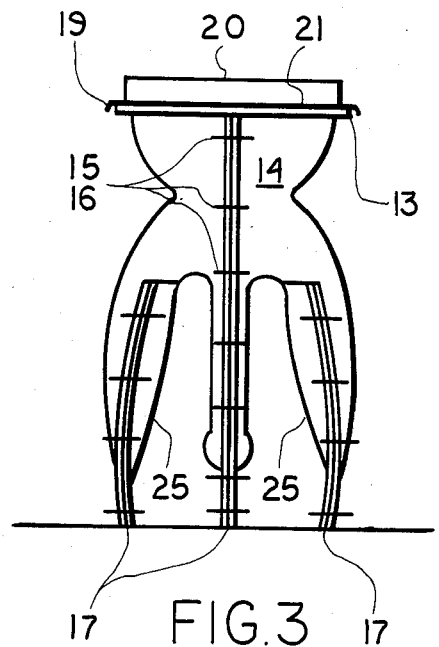
FIG. 3 is an end view of the apparatus of FIG. 2.
Figure 4:
FIG. 4 shows the swan statuary produced by the molding apparatus of FIG. 2.

Referring to FIGS. 1-3, an embodiment of molding apparatus of this invention is shown comprised of paired rigid sidewalls 10, each configured to produce substantially half of the swan statuary of FIG. 4, and having a flat peripheral flange 11 extending about the front bottom, front side and upper rear side extremities, 22, 23 and 24, respectively. A flat upper outwardly directed rim 12 is perpendicularly disposed to said flange. The sidewalls are adapted to mate at their flanges, whereby the rims meet to form a closed planar perimeter 13 and thereby form enclosure 14 which is closed except at its upper extremity defined by perimeter 13. The specialized, realistically contoured configuration of the swan requires that supplemental panels 25 be utilized on the interior facing surfaces of the wings of the swan. Apertures 26, in spaced apart arrangement along flange 11, facilitate joinder of the two sidewalls by bolts 15 and wing nuts 16. Said supplemental panels are similarly joined to the interior periphery of each sidewall.

In the exemplified embodiment, the lowermost extremities 17 of the flanges are disposed at three points in coplanar relationship, thereby constituting supporting means which maintain the apparatus upright with the flanges in vertical disposition and perimeter 13 in horizontal disposition. In other embodiments, the supporting means may be posts, legs or stands adapted to establish stable upright positioning of the mold.

The sidewalls may be fabricated of fiberglass-reinforced plastic material commonly used in making negative impressions of three-dimensional objects. The fiberglass/plastic sidewall may be made by spraying a fast-setting catalyzed resin and fiberglass mixture onto a three dimensional object coated with a release agent until an appropriate layer of the plastic is built up.

A contoured thin flexible water-impermeable envelope 18 is placed within the enclosure formed by the mated sidewalls, and is arranged so that its contour seats within the matching contours of the sidewalls, and its open mouth 19 is draped over perimeter 13. The envelope is fabricated by applying repeated coatings of an elastomeric material such as a latex upon a statue or other object whose shape the ice molding is intended to assume. When a sufficient thickness of elastomeric material is built up, the integral envelope is peeled away from the statuary.

In the case of statuary objects such as the swan wherein the upper portions protrude with respect to the base, the flexible envelope is caused to have front and rear pleats 28 and associated doubled wall structure 29. By virtue of such specialized construction the envelope can be expanded in order to peel it off the frozen sculpture.

The thermally insulative cover 20 is of uniform thickness, having a flat lower surface 21, and a lateral size and shape adequate to completely cover perimeter 13 while at the same time pressing against the mouth opening of the envelope lying against the perimeter. Suitable insulative materials include wood and closed cell foams. The cover is preferably weighted to stabilize its position and provide a firm seal against the mouth of the envelope. The seal, however, must permit escape of some water which is driven upwardly as ice forms and expands in the lower portions of the mold. Such multiple functions of the cover permit the securement of ice statues of good clarity and free of cracks.

When the frozen ice sculpture is removed from the molding apparatus, the envelope is carefully peeled away, causing it to be inverted but easily reversed for subsequent use. A period of warming of the freshly removed sculpture facilitates removal of the envelope. The presence of a lubricant such as a soap upon the interior surface of the envelope further facilitates its removal from the ice sculpture.

The water utilized to make the ice sculpture may contain dyes or suspended material to create specialized artistic appearances. In view of the special apparatus and method of this invention molded objects of varied shape and size may be produced. Two or more of the bolted together sidewall assemblies may be vertically stacked to produce tall sculptures.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A method for making ice sculptures utilizing the apparatus defined by:
    (a) at least two sidewalls, each configured to produce opposing portions of a three-dimensional sculpture and having a flat upper rim adapted to be disposed in a horizontal plane, side extremities, and a flat peripheral flange bordering each side extremity in a plane perpendicular to said rim, said sidewalls being adapted to mate at their flanges whereby the rims meet to form a closed planar perimeter and thereby form an enclosure which is open at its upper extremity defined by said upper rims, said upper extremity being adapted to be substantially horizontally disposed and representing the top or bottom of a sculpture to be made in said mold,
    (b) clamping means adapted to releasably hold the flanges of said sidewalls in tight abutment,
    (c) support means to maintain the mold upright whereby said upper extremity is caused to lie in a substantially horizontal plane,
    (d) a thin flexible water-impermeable envelope contoured to match the interior configuration of said enclosure and adapted to be inserted therein and having a mouth opening adapted to fit onto said upper rim, and
    (e) a thermally insulative cover adapted to rest upon said upper extremity whereby the mouth of said envelope is held in sandwiched engagement between said cover and rim, and comprising the steps of:
    (f) assembling said molding apparatus by clamping the flanges of the sidewalls together to form an enclosure,
    (f) supporting the mold such that the flanges are in verticle plane and the upper rims are in a horizontal plane,
    (h) inserting said envelope into said enclosure in a manner such that the contour of the envelope registers with the interior configuration of the sidewalls, and draping the mouth opening of the envelope over said upper rims, (i) filling the envelope with water, (j) placing the aforesaid insulative cover upon the rims, (k) placing the entire assembly in a cold environment to cause freezing of the water to an ice sculpture, (l) removing the cover, (m) separating the sidewalls, and (n) peeling the envelope is inverted to an inside out configuration readily reversed for subsequent use.

2. The method of claim 1 for making a bowl sculpture wherein the molding apparatus disposes the intended top of the bowl in an upward direction, and the entire assembly is removed from said cold environment prior to complete freezing, whereby an unfrozen upwardly opening centered depression is caused to exist in the resultant bowl.

* * * * *